(12) United States Patent
Wei

(10) Patent No.: US 10,084,622 B2
(45) Date of Patent: Sep. 25, 2018

(54) METHOD, DEVICE, AND COMPUTER STORAGE MEDIUM FOR ELIMINATING INTER-CARRIER INTERFERENCE

(71) Applicant: ZTE Corporation, Shenzhen, Guangdong (CN)

(72) Inventor: Jidong Wei, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 15/328,885

(22) PCT Filed: Nov. 28, 2014

(86) PCT No.: PCT/CN2014/092563
§ 371 (c)(1),
(2) Date: Jan. 24, 2017

(87) PCT Pub. No.: WO2016/019659
PCT Pub. Date: Feb. 11, 2016

(65) Prior Publication Data
US 2017/0214555 A1    Jul. 27, 2017

(30) Foreign Application Priority Data
Aug. 7, 2014 (CN) .......................... 2014 1 0387067

(51) Int. Cl.
*H04L 25/03* (2006.01)
*H04L 27/26* (2006.01)

(52) U.S. Cl.
CPC .. *H04L 25/03821* (2013.01); *H04L 25/03159* (2013.01); *H04L 27/265* (2013.01); *H04L 27/2628* (2013.01)

(58) Field of Classification Search
CPC ......... H04L 25/03821; H04L 25/03159; H04L 27/265; H04L 27/2628
See application file for complete search history.

(56) References Cited

U.S. PATENT DOCUMENTS 9,246,734 B1 * 1/2016 Meade ................ H04L 27/2657
2004/0005010 A1    1/2004 He
(Continued)

FOREIGN PATENT DOCUMENTS

CN    102113286 A    6/2011
CN    102752253 A    10/2012
(Continued)

OTHER PUBLICATIONS

International Search Report in international application No. PCT/CN2014/092563, dated May 15, 2015, 2 pgs.
(Continued)

*Primary Examiner* — David B. Lugo
(74) *Attorney, Agent, or Firm* — Cooper Legal Group, LLC

(57) ABSTRACT

The embodiment of the disclosure discloses a method and device for eliminating Inter-Carrier Interference (ICI) and a computer storage medium. The method for eliminating the ICI includes that: a user frequency offset value is acquired; an order of a filter is determined according to the user frequency offset value; a filter coefficient is constructed according to the order of the filter; user carrier data is received; and ICI elimination is performed on a target subcarrier according to frequency-domain data on adjacent subcarriers of the target subcarrier and filter coefficients of corresponding positions of the adjacent subcarriers, wherein the target subcarrier is any carrier in the user carrier data.

12 Claims, 3 Drawing Sheets

(56) References Cited

U.S. PATENT DOCUMENTS

| | | | | |
|---|---|---|---|---|
| 2006/0256894 A1* | 11/2006 | Kim | ................... | H04L 27/2657 |
| | | | | 375/326 |
| 2008/0144486 A1* | 6/2008 | Wilhelmsson | .... | H04L 25/03006 |
| | | | | 370/208 |
| 2008/0186841 A1* | 8/2008 | Fung | ..................... | H04B 1/707 |
| | | | | 370/203 |
| 2008/0232516 A1* | 9/2008 | Cheng | ................... | H04L 5/023 |
| | | | | 375/344 |
| 2015/0282171 A1* | 10/2015 | Yu | ....................... | H04B 7/0857 |
| | | | | 370/330 |

FOREIGN PATENT DOCUMENTS

| | | | |
|---|---|---|---|
| CN | 103179059 A | 6/2013 | |
| CN | 103428128 A | 12/2013 | |
| WO | 2009069088 A2 | 6/2009 | |

OTHER PUBLICATIONS

English Translation of the Written Opinion of the International Search Authority in international application No. PCT/CN2014/092563, dated May 15, 2015, 6 pgs.

Supplementary European Search Report in European application No. 14899106.0, dated Jul. 21, 2017, 19 pgs.

\* cited by examiner

METHOD, DEVICE, AND COMPUTER STORAGE MEDIUM FOR ELIMINATING INTER-CARRIER INTERFERENCE

TECHNICAL FIELD

The disclosure relates to an interference elimination technology, and particularly to a method, device and computer storage medium for eliminating Inter-Carrier Interference (ICI).

BACKGROUND

The Orthogonal Frequency Division Multiplexing (OFDM) technology requires a characteristic of mutual orthogonality between subcarriers, and is very sensitive to a frequency offset. Under the condition that a frequency offset exists, orthogonality between OFDM subcarriers may be damaged, and ICI may be generated. Particularly under the condition of a large frequency offset, since energy of an adjacent carrier leaks relatively large, system performance may be sharply deteriorated if ICI is not eliminated.

Therefore, solving the problem of ICI becomes one of core problems of the OFDM technology. Various methods for solving the frequency offset problem are proposed at present, which are mainly divided into time-domain methods and frequency-domain methods. However, these methods may not well solve the problem of ICI caused by a large frequency offset. Or, a part of a frequency offset value may be eliminated in a time domain by virtue of a concept of interpolation, but such a method may still not solve the problem of poor performance under the condition of high order modulation or large frequency offset. Or, a part of the frequency offset value may be eliminated in a frequency-domain convolution manner, but such a method costs too much in implementation, and has poorer practicability. Or, a part of the frequency offset value may be eliminated by a method like frequency-domain filtering, but since the filter coefficients are symmetric, adopting the symmetric filter coefficients under the condition of a large frequency offset may cause certain performance loss, and the loss is more obvious particularly under the condition of high code rate.

SUMMARY

The embodiment of the disclosure provides a method, device, and computer storage medium for eliminating ICI, which may effectively solve the problem of ICI in an OFDM system.

The technical solutions of the embodiment of the disclosure are implemented as follows.

The embodiment of the disclosure provides a method for eliminating ICI, which may include that:

a user frequency offset value is acquired;

an order of a filter is determined according to the user frequency offset value;

filter coefficients are constructed according to the order of the filter;

user carrier data is received; and

ICI elimination is performed on a target subcarrier according to frequency-domain data on adjacent subcarriers of the target subcarrier and filter coefficients of corresponding positions of the adjacent subcarriers, and the target subcarrier may be any carrier in the user carrier data.

In another embodiment, the step that the order of the filter is determined according to the user frequency offset value may include that:

the number M of adjacent subcarriers participating in ICI elimination of the target subcarrier is determined according to the user frequency offset value; and the order of the filter is determined to be 2M+1 according to the number M of the adjacent subcarriers participating in ICI elimination of the target subcarrier.

In another embodiment, when the order of the filter is 2M+1, the step that the filter coefficients are constructed according to the order of the filter may include that:

two coefficient tables of which depths are 2M+1 are constructed respectively, and an expression met by a first coefficient table may be:

$$\text{Table1} = \frac{\cos(\pi l/N)}{e^{-j\pi/N}} \quad l = -M, -M+1, \ldots, -1, 1, \ldots, M-1, M,$$

and an expression met by a second coefficient table may be:

$$\text{Table2} = \frac{\sin(\pi l/N)N}{\pi e^{-j\pi/N}} \quad l = -M, -M+1, \ldots, -1, 1, \ldots, M-1, M;$$

and the filter coefficients are constructed according to the first coefficient table and the second coefficient table, and an expression met by the filter coefficients is:

$$\text{filter}(l) = \begin{cases} \text{Matrix}(l), & l = -M, -M+1, \ldots -1, 1, \ldots, M \\ 1, & l = 0 \end{cases},$$

$$\text{where Matrix} = \frac{\varepsilon}{\varepsilon \cdot \text{Table1} - \text{Table2}},$$

where N may represent point number of system Inverse Fast Fourier Transform (IFFT), ε may represent a frequency offset value obtained by normalization of a carrier spacing, and l may represent a spacing between the target subcarrier and each adjacent subcarrier.

In another embodiment, the step that the user carrier data is received may include that:

the user carrier data is received, and whether the user carrier data is frequency-domain data is judged to obtain a judgment result;

when the judgment result indicates that the user carrier data is frequency-domain data, ICI elimination is directly performed on the frequency-domain data; and when the judgment result indicates that the user carrier data is time-domain data, Fast Fourier Transform (FFT) is performed on the time-domain data to obtain frequency-domain data, and ICI elimination is performed on the frequency-domain data.

In another embodiment, the step that ICI elimination is performed on the target subcarrier according to the frequency-domain data on the adjacent subcarriers of the target subcarrier and the filter coefficients of the corresponding positions of the adjacent subcarriers may include that:

the target subcarrier in the frequency-domain data is determined, and frequency-domain values on the adjacent subcarriers of the target subcarrier and the filter coefficients of the corresponding positions of the adjacent subcarriers are multiplied to obtain multiplication results corresponding to each adjacent subcarrier; and the multiplication results corresponding to each adjacent subcarrier are summed and output to implement ICI elimination of the target subcarrier.

The embodiment of the disclosure also provides a device for eliminating ICI, which may include: an acquisition unit, a construction unit, a data receiving unit and an interference elimination unit, and the acquisition unit may be configured to acquire a user frequency offset value;

the construction unit may be configured to determine an order of a filter according to the user frequency offset value acquired by the acquisition unit, and construct filter coefficients according to the order of the filter;

the data receiving unit may be configured to receive user carrier data; and the interference elimination unit may be configured to perform ICI elimination on a target subcarrier received by the data receiving unit according to frequency-domain data on adjacent subcarriers of the target subcarrier and filter coefficients of corresponding positions of the adjacent subcarriers, and the target subcarrier may be any carrier in the user carrier data.

In another embodiment, the construction unit may be configured to determine the number M of adjacent subcarriers participating in ICI elimination of the target subcarrier according to the user frequency offset value acquired by the acquisition unit; and determine the order of the filter to be 2M+1 according to the number M of the adjacent subcarriers participating in ICI elimination of the target subcarrier.

In another embodiment, the construction unit may be configured to, when the order of the filter is 2M+1, construct two coefficient tables of which depths are 2M+1 respectively, wherein an expression met by a first coefficient table may be:

$$\text{Table1} = \frac{\cos(\pi l/N)}{e^{-j\pi l/N}} \; l = -M, -M+1, \ldots, -1, 1, \ldots, M-1, M,$$

and an expression met by a second coefficient table may be:

$$\text{Table2} = \frac{\sin(\pi l/N)N}{\pi e^{-j\pi l/N}} \; l = -M, -M+1, \ldots, -1, 1, \ldots, M-1, M;$$

and construct the filter coefficients according to the first coefficient table and the second coefficient table, an expression met by the filter coefficient s is:

$$\text{filter}(l) = \begin{cases} \text{Matrix}(l), & l = -M, -M+1, \ldots -1, 1, \ldots, M \\ 1, & l = 0 \end{cases},$$

$$\text{where Matrix} = \frac{\varepsilon}{\varepsilon \cdot \text{Table1} - \text{Table2}},$$

where N may represent point number of system IFFT, ε may represent a frequency offset value obtained by normalization of carrier spacing, and l may represent a spacing between the target subcarrier and each adjacent subcarrier.

In another embodiment, the device may further include a judgment processing unit, configured to judge whether the user carrier data received by the data receiving unit is frequency-domain data to obtain a judgment result; when the judgment result indicates that the user carrier data is frequency-domain data, directly send the frequency-domain data to the interference elimination unit; and when the judgment result indicates that the user carrier data is time-domain data, perform FFT on the time-domain data to obtain frequency-domain data, and send the frequency-domain data to the interference elimination unit.

In another embodiment, the interference elimination unit may be configured to determine the target subcarrier in the frequency-domain data, and multiply the frequency-domain data on the adjacent subcarriers of the target subcarrier and the filter coefficients of the corresponding positions of the adjacent subcarriers to obtain multiplication results corresponding to each adjacent subcarrier; and sum and output the multiplication results corresponding to each adjacent subcarrier to implement ICI elimination of the target subcarrier.

The embodiment of the disclosure also provides a computer storage medium, in which a computer-executable instruction may be stored. The computer-executable instruction is configured to execute the method for eliminating the ICI in the embodiment of the disclosure.

According to the method, device, computer storage medium for eliminating the ICI provided by the embodiment of the disclosure, the user frequency offset value is acquired; the order of the filter is determined according to the user frequency offset value; the filter coefficients are constructed according to the order of the filter; the user carrier data is received; and ICI elimination is performed on the target subcarrier according to the frequency-domain data on the adjacent subcarriers of the target subcarrier and the filter coefficients of the corresponding positions of the adjacent subcarriers. The target subcarrier is any carrier in the user carrier data. Therefore, by adopting a frequency-domain filtering method in the embodiment of the disclosure, the problem of ICI in an OFDM system is effectively solved. Not only the ICI of a single user may be effectively eliminated, but also the ICI of multiple users may be effectively eliminated. In addition, the ICI caused by a large frequency offset may also be effectively eliminated, and cost for ICI elimination is greatly reduced.

DETAILED DESCRIPTION

The disclosure will be further described below with reference to the drawings and specific embodiments in detail.

Figure 1:
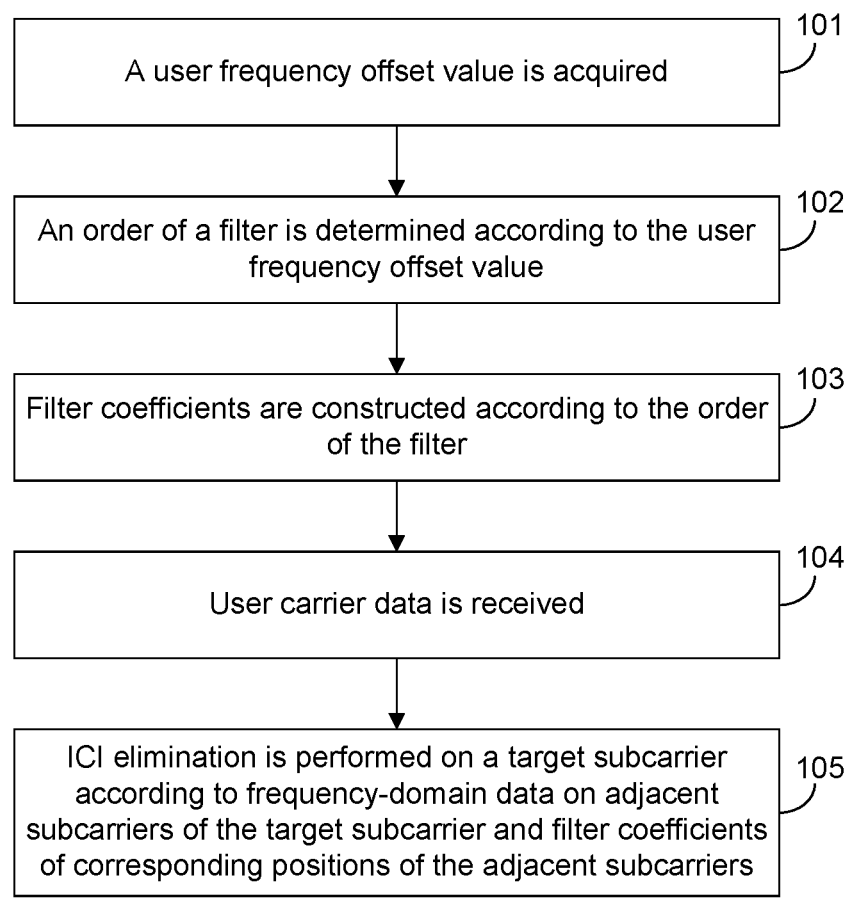
FIG. 1 is a flowchart of a method for eliminating ICI according to an embodiment of the disclosure.

The embodiment of the disclosure provides a method for eliminating ICI. FIG. 1 is a flowchart of a method for eliminating ICI according to an embodiment of the disclosure. As shown in FIG. 1, the method includes the following steps.

Step 101: a user frequency offset value is acquired.

Here, the user frequency offset value may adopt a historical frequency offset value of a user, may also adopt an estimated frequency offset value, or may also be an input user frequency offset value.

Step 102: an order of a filter is determined according to the user frequency offset value.

Here, the step that the order of the filter is determined according to the user frequency offset value includes that:

the number M of adjacent subcarriers participating in ICI elimination of a target subcarrier is determined according to the user frequency offset value; and the order of the filter is determined to be 2M+1 according to the number M of the adjacent subcarriers participating in ICI elimination of the target subcarrier.

Specifically, the order of the filter is related to a magnitude of the user frequency offset value, that is, existence of the user frequency offset value causes damage to orthogonality between each subcarrier and energy leakage of each subcarrier to other subcarriers, thereby causing ICI. The user frequency offset value is related to the degree of energy leakage of the adjacent subcarriers to the target subcarrier, and if the user frequency offset value is larger, energy of the adjacent subcarriers leaks more to the target subcarrier, and the number of the adjacent subcarriers participating in ICI elimination of the target subcarrier is larger, so that the order of the filter is higher.

In another implementation mode, in the determination process of the order of the filter, the order of the filter may also be adaptively determined according to a magnitude of energy leaked to the adjacent subcarriers by the target subcarrier, or, the order of the filter may also adopt a fixed order. The specific manner adopted to determine the order of the filter may be determined adaptively.

Step 103: filter coefficients are constructed according to the order of the filter.

Here, when the order of the filter is 2M+1, the step that the filter coefficients are constructed according to the order of the filter includes that:

two coefficient tables of which depths are 2M+1 are constructed respectively, wherein an expression met by a first coefficient table is:

$$\text{Table1} = \frac{\cos(\pi l/N)}{e^{-j\pi l/N}} \quad l = -M, -M+1, \ldots, -1, 1, \ldots, M-1, M, \quad (1)$$

and an expression met by a second coefficient table is:

$$\text{Table2} = \frac{\sin(\pi l/N)N}{\pi e^{-j\pi l/N}} \quad l = -M, -M+1, \ldots, -1, 1, \ldots, M-1, M; \quad (2)$$

and the filter coefficients are constructed according to the first coefficient table and the second coefficient table, an expression met by the filter coefficients is:

$$\text{filter}(l) = \begin{cases} \text{Matrix}(l), & l = -M, -M+1, \ldots -1, 1, \ldots, M \\ 1, & l = 0 \end{cases}, \quad (3)$$

$$\text{where Matrix} = \frac{\varepsilon}{\varepsilon \cdot \text{Table1} - \text{Table2}},$$

where N represents the point number of a system IFFT, and is related to the system bandwidth, $\varepsilon$ represents a frequency offset value obtained by normalization of carrier spacing, and l represents a spacing between the target subcarrier and each adjacent subcarrier.

Wherein, Table 1 and Table 2 constructed in the filter coefficients process of the embodiment of the disclosure are related to the spacing and bandwidth between the target subcarrier and each adjacent subcarrier. In a practical process, a fixed filter related coefficient table may also be constructed, and filter coefficients of corresponding positions of each subcarrier are obtained in a table lookup manner. In addition, a coefficient table corresponding to different bandwidths and different frequency offset values may also be constructed by virtue of the abovementioned filter coefficients acquisition manner. During implementation, the filter coefficients are directly acquired by virtue of the table lookup manner, and the selection of a frequency offset may neglect a certain error between a practical frequency offset value and a compensation value. The frequency offset value may be selected based on different granularities within a certain range according to a requirement on accuracy.

Step 104: user carrier data is received.

Here, the step that the user carrier data is received includes that:

the user carrier data is received, and whether the user carrier data is frequency-domain data is judged to obtain a judgment result; when the judgment result indicates that the user carrier data is frequency-domain data, ICI elimination is directly performed on the frequency-domain data, that is, Step 105 is executed; and when the judgment result indicates that the user carrier data is time-domain data, FFT is performed on the time-domain data to obtain frequency-domain data, and ICI elimination is performed on the frequency-domain data, that is, Step 105 is executed.

Step 105: ICI elimination is performed on the target subcarrier according to frequency-domain data on the adjacent subcarriers of the target subcarrier and filter coefficients of corresponding positions of the adjacent subcarriers. The target subcarrier is any carrier in the user carrier data.

Here, the step that ICI elimination is performed on the target subcarrier according to the frequency-domain data on the adjacent subcarriers of the target subcarrier and the filter coefficients of the corresponding positions of the adjacent subcarriers includes that:

the target subcarrier in the frequency-domain data is determined, and frequency-domain values on the adjacent subcarriers of the target subcarrier and the filter coefficients of the corresponding positions of the adjacent subcarriers are multiplied to obtain multiplication results corresponding to each adjacent subcarrier; and the multiplication results corresponding to each adjacent subcarrier are summed and output to implement ICI elimination of the target subcarrier.

Specifically, the target subcarrier is any subcarrier in the frequency-domain data. After the target subcarrier is determined, the target subcarrier is aligned with a central position of the filter coefficients, that is, the position of the target subcarrier is determined to be a position corresponding to l=0 in Formula (3). The filter coefficients of the corresponding positions of the adjacent subcarriers of the target subcarrier are determined according to the filter coefficients Matrix(1) determined in Formula (3). The adjacent subcarriers of the target subcarrier may not only be left and right subcarriers of the target subcarrier, and may also be multiple subcarriers adjacent to the target subcarrier. For example, in subcarrier 1, subcarrier 2, subcarrier 3, subcarrier 4 and subcarrier 5, the subcarrier 3 is the target subcarrier, and the subcarrier 1, the subcarrier 2, the subcarrier 4 and the subcarrier 5 may all be adjacent subcarriers of the target subcarrier. When the subcarrier 1 has a frequency-domain value A1 and corresponds to a filter coefficient Q1, the subcarrier 2 has a frequency-domain value A2 and corresponds to a filter coefficient Q2, the subcarrier 4 has a frequency-domain value A4 and corresponds to a filter coefficient Q4, and the subcarrier 5 has a frequency-domain value A5 and corresponds to a filter coefficient Q5, A1×Q1+A2×Q2+A4×Q4+A5×Q5 is output to implement ICI elimination of the target subcarrier. Here, ICI elimination for only a subcarrier is described only, and furthermore, the central position of the filter coefficients is moved to the next subcarrier on which ICI elimination is to be performed, and the abovementioned operation is repeated until ICI elimination of all the subcarriers is implemented.

In the step, the ICI of all the adjacent subcarriers to the target subcarrier may be eliminated, and the ICI of a part of the adjacent subcarriers to the target subcarrier may also be eliminated. When the ICI of a part of the adjacent subcarriers to the target subcarrier is eliminated, it is necessary to consider magnitude of energy leaked to the target subcarrier by the adjacent subcarriers.

Figure 2:
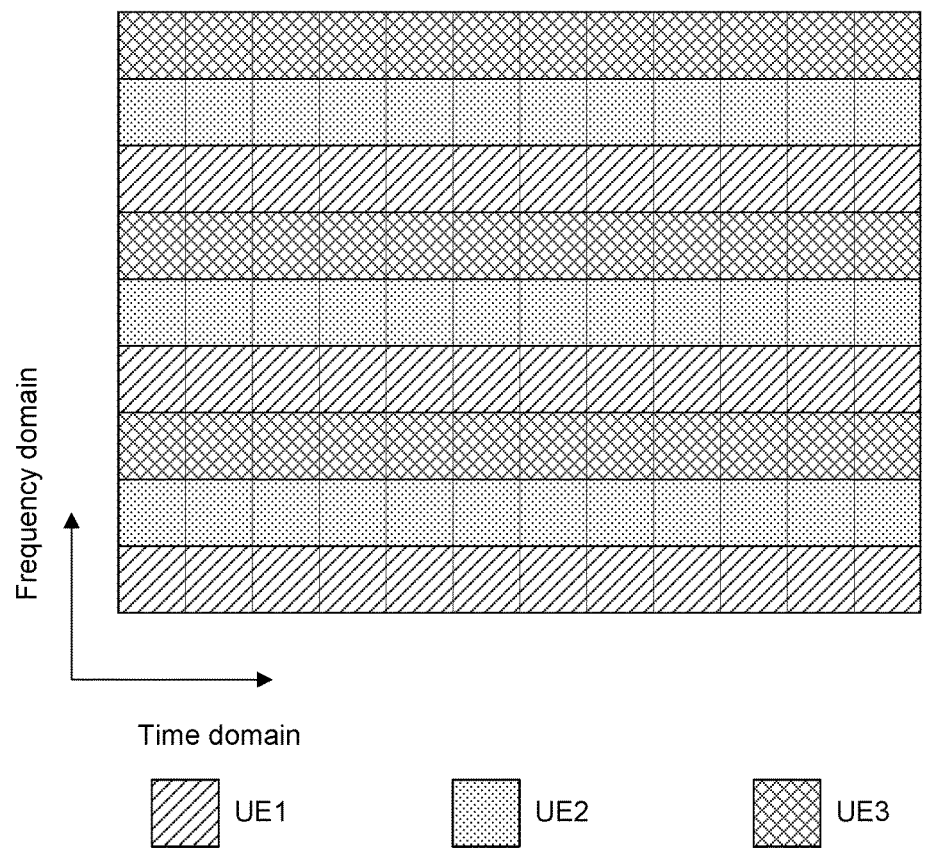
FIG. 2 is a schematic diagram of a first application scenario for subcarriers according to an embodiment of the disclosure.
Figure 3:
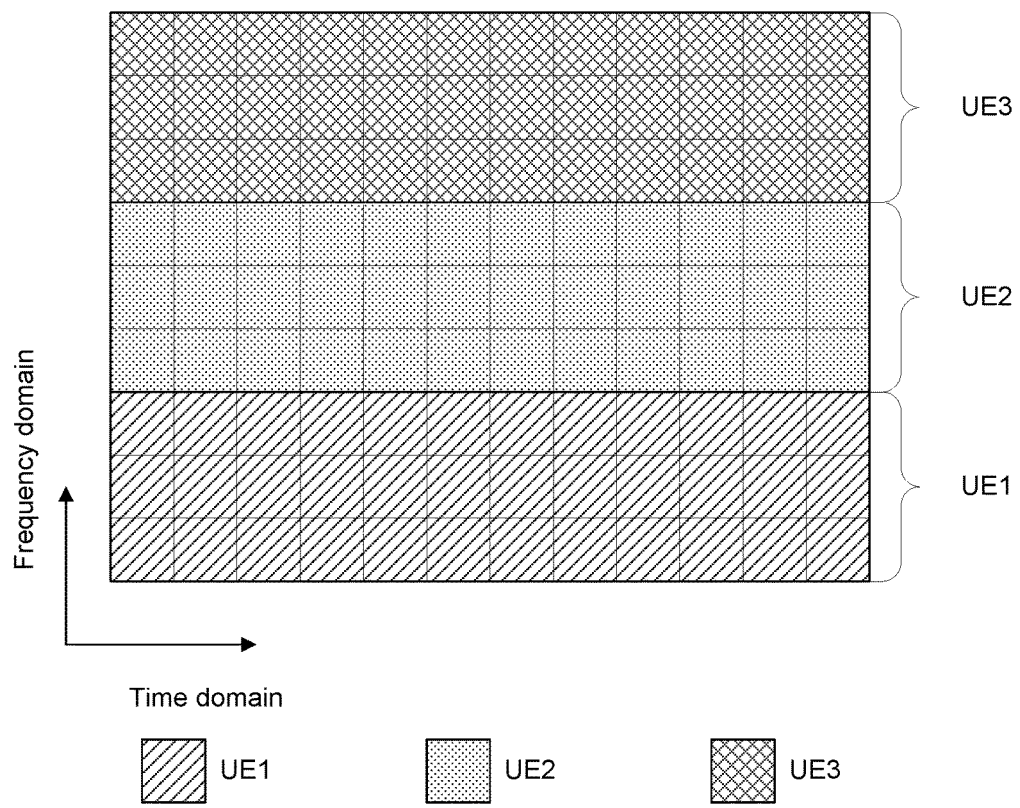
FIG. 3 is a schematic diagram of a second application scenario for subcarriers according to an embodiment of the disclosure.

The technical solution provided by the embodiment is a single-user ICI elimination solution, and the technical solution provided by the embodiment of the disclosure may also be applied to a multiuser ICI elimination scenario. FIG. 2 is a schematic diagram of a first application scenario of subcarriers according to an embodiment of the disclosure. As shown in FIG. 2, three users, i.e. UE 1, UE 2 and UE 3 respectively, are listed, and distributed distribution is adopted for frequency-domain resources of the three UEs. FIG. 3 is a schematic diagram of a second application scenario of subcarriers according to an embodiment of the disclosure. As shown in FIG. 3, three users, i.e. UE 1, UE 2 and UE 3 respectively, are also listed, and centralized distribution is adopted for frequency-domain resources of the three UEs. No matter whether distributed distribution or centralized distribution is adopted for the UEs, the technical solution provided by the embodiment of the disclosure is applicable.

Specifically, under a multiuser condition, all user frequency offset values may not be the same, and may even be greatly different. Under the condition that each user frequency offset value is slightly different, only one filter coefficient may be constructed, and ICI of all the users is eliminated according to the filter coefficients. When each user frequency offset value is greatly different or only a part of user frequency offset values in all the user frequency offset values are slightly different, filter coefficients may be constructed for each user frequency offset value, and when mixed carrier data of multiple users is received, firstly data separation is performed on the mixed carrier data of the multiple users to obtain user carrier data of each user, and then ICI elimination is performed on the user carrier data of each user according to the filter coefficients corresponding to each user by virtue of the technical solution of Step 101 to Step 105 in the embodiment of the disclosure respectively.

Specifically, when the determined order of the filter is 2M+1, the filter coefficients constructed for the multiuser condition meets the following expression:

$$\text{filter}^u(l) = \begin{cases} \text{Matrix}^u(l), & l = -M, -M+1, \ldots -1, 1, \ldots, M \\ 1, & l = 0 \end{cases} \quad (4)$$

where $\text{Matrix}^u = \dfrac{\varepsilon^u}{\varepsilon^u \cdot \text{Table1} - \text{Table2}}$, $$\text{Table1} = \dfrac{\cos(\pi l / N)}{e^{-j\pi l/N}} \quad l = -M, -M+1, \ldots, -1, 1, \ldots, M-1, M,$$

and $$\text{Table2} = \dfrac{\sin(\pi l / N)N}{\pi e^{-j\pi l/N}} \quad l = -M, -M+1, \ldots, -1, 1, \ldots, M-1, M,$$

where N represents point number of the system IFFT, and is related to the system bandwidth; u represents a serial number of a user, u=1, . . . , P, and P is the total number of the users; and $\varepsilon^{(u)}$ represents a frequency offset value, obtained by normalization of carrier spacing, of user u, and l represents the spacing between the target subcarrier and each adjacent subcarrier.

The embodiment of the disclosure also provides a computer storage medium, in which a computer-executable instruction is stored, the computer-executable instruction being configured to execute the method for eliminating the ICI in the embodiment of the disclosure.

Figure 4:
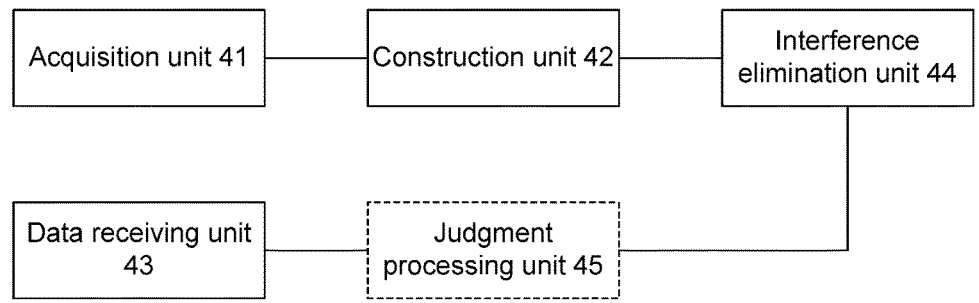
FIG. 4 is a structure diagram of a device for eliminating ICI according to an embodiment of the disclosure.

The embodiment of the disclosure also provides a device for eliminating ICI. FIG. 4 is a structure diagram of a device for eliminating ICI according to an embodiment of the disclosure. As shown in FIG. 4, the device includes: an acquisition unit 41, a construction unit 42, a data receiving unit 43 and an interference elimination unit 44, where the acquisition unit 41 is configured to acquire a user frequency offset value;

the construction unit 42 is configured to determine an order of a filter according to the user frequency offset value acquired by the acquisition unit 41, and construct filter coefficients according to the order of the filter;

the data receiving unit 43 is configured to receive user carrier data; and the interference elimination unit 44 is configured to perform ICI elimination on a target subcarrier received by the data receiving unit 43 according to frequency-domain data on adjacent subcarriers of the target subcarrier and filter coefficients of corresponding positions of the adjacent subcarriers. The target subcarrier is any carrier in the user carrier data.

Here, the user frequency offset value acquired by the acquisition unit 41 may adopt a historical frequency offset value of a user, may also adopt an estimated frequency offset value, or may also be an input user frequency offset value.

Specifically, the construction unit 42 is configured to determine the number M of adjacent subcarriers participating in ICI elimination of the target subcarrier according to the user frequency offset value acquired by the acquisition unit 41; and determine the order of the filter to be 2M+1 according to the number M of the adjacent subcarriers participating in ICI elimination of the target subcarrier.

Here, in the process of determining the order of the filter by the construction unit 42, the order of the filter may also be adaptively determined according to a magnitude of energy leaked to the adjacent subcarriers by the target subcarrier, or, the order of the filter may also adopt a fixed order.

The construction unit 42 is configured to, when the order of the filter is 2M+1, construct two coefficient tables of which depths are 2M+1 respectively. The expression met by a first coefficient table is:

$$\text{Table1} = \dfrac{\cos(\pi l / N)}{e^{-j\pi l/N}} \quad l = -M, -M+1, \ldots, -1, 1, \ldots, M-1, M, \quad (1)$$

and
an expression met by a second coefficient table is:

$$\text{Table2} = \frac{\sin(\pi l/N)N}{\pi e^{-j\pi/N}} \quad l = -M, -M+1, \ldots, -1, 1, \ldots, M-1, M; \quad (2)$$

and
construct the filter coefficients according to the first coefficient table and the second coefficient table, the expression met by the filter coefficients is:

$$\text{filter}(l) = \begin{cases} \text{Matrix}(l), & l = -M, -M+1, \ldots -1, 1, \ldots, M \\ 1, & l = 0 \end{cases}, \quad (3)$$

$$\text{where Matrix} = \frac{\varepsilon}{\varepsilon \cdot \text{Table1} - \text{Table2}},$$

where N represents point number of the system IFFT, and is related to the system bandwidth, ε represents a frequency offset value obtained by normalization of carrier spacing, and l represents a spacing between the target subcarrier and each adjacent subcarrier.

Wherein, Table 1 and Table 2 constructed by the construction unit 42 in the filter coefficients construction process are related to the spacing and bandwidth between the target subcarrier and each adjacent subcarrier. In the practical process, a fixed filter related coefficient table may also be constructed, and filter coefficients of corresponding positions of each subcarrier are obtained in a table lookup manner. In addition, a coefficient table corresponding to different bandwidths and different frequency offset values may also be constructed by virtue of the abovementioned filter coefficients acquisition manner. During the implementation, the filter coefficients are directly acquired by virtue of the table lookup manner. The selection of a frequency offset may neglect a certain error between a practical frequency offset value and a compensation value, and the frequency offset value may be selected based on different granularities within a certain range according to a requirement on accuracy.

In another embodiment, the device further includes a judgment processing unit 45, configured to judge whether the user carrier data received by the data receiving unit 43 is frequency-domain data so as to obtain a judgment result. When the judgment result indicates that the user carrier data is frequency-domain data, the frequency-domain data is directly sent to the interference elimination unit 44, and when the judgment result indicates that the user carrier data is time-domain data, FFT on the time-domain data is performed to obtain frequency-domain data, and then he frequency-domain data is sent to the interference elimination unit 44.

Specifically, the interference elimination unit 44 is configured to determine the target subcarrier in the frequency-domain data, and multiply the frequency-domain data on the adjacent subcarriers of the target subcarrier and the filter coefficients of the corresponding positions of the adjacent subcarriers to obtain multiplication results corresponding to each adjacent subcarrier; and the multiplication results corresponding to each adjacent subcarrier are summed and output to implement ICI elimination of the target subcarrier.

Specifically, the target subcarrier is any subcarrier in the frequency-domain data. After the target subcarrier is determined, since the constructed filter coefficients are of a symmetric structure, the target subcarrier is aligned with a central position of the filter coefficients, that is, a position of the target subcarrier is determined to be a position corresponding to l=0 in Formula (3). The filter coefficients of the corresponding positions of the adjacent subcarriers of the target subcarrier are determined according to the filter coefficients Matrix(l) determined in Formula (3). The adjacent subcarriers of the target subcarrier may not only be left and right subcarriers of the target subcarrier, and may also be multiple subcarriers adjacent to the target subcarrier. For example, in subcarrier 1, subcarrier 2, subcarrier 3, subcarrier 4 and subcarrier 5, the subcarrier 3 is the target subcarrier, and the subcarrier 1, the subcarrier 2, the subcarrier 4 and the subcarrier 5 may all be adjacent subcarriers of the target subcarrier. When the subcarrier 1 has a frequency-domain value A1 and corresponds to a filter coefficient Q1, the subcarrier 2 has a frequency-domain value A2 and corresponds to a filter coefficient Q2, the subcarrier 4 has a frequency-domain value A4 and corresponds to a filter coefficient Q4, and the subcarrier 5 has a frequency-domain value A5 and corresponds to a filter coefficient Q5, A1×Q1+A2×Q2+A4×Q4+A5×Q5 is output to implement ICI elimination of the target subcarrier. Here, ICI elimination of only a subcarrier is described, and furthermore, the central position of the filter coefficients is moved to the next subcarrier on which ICI elimination is to be performed, and the abovementioned operation is repeated until ICI elimination of all the subcarriers is implemented.

Specifically, under a multiuser condition, all user frequency offset values may not be the same, and may even be greatly different. Under the condition that each user frequency offset value is slightly different, the construction unit 42 may construct only one filter coefficient. The interference elimination unit 44 eliminates ICI of all users according to the only one filter coefficient. When each user frequency offset value is greatly different or only a part of user frequency offset values in all user frequency offset values are slightly different, the construction unit 42 may construct filter coefficients for each user frequency offset value, and when mixed carrier data of multiple users is received, the device further includes a data separation unit. The data separation is performed on the mixed carrier data of the multiple users to obtain user carrier data of each user through the data separation unit, and then ICI elimination is performed on the user carrier data of each user according to the filter coefficients corresponding to each user by virtue of the technical solution of the embodiment of the disclosure respectively.

Specifically, when the determined order of the filter is 2M+1, the filter coefficients constructed for the multiuser condition meets the following expression:

$$\text{filter}^u(l) = \begin{cases} \text{Matrix}^u(l), & l = -M, -M+1, \ldots -1, 1, \ldots, M \\ 1, & l = 0 \end{cases}, \quad (4)$$

$$\text{where Matrix}^u = \frac{\varepsilon^u}{\varepsilon^u \cdot \text{Table1} - \text{Table2}},$$

$$\text{Table1} = \frac{\cos(\pi l/N)}{e^{-j\pi/N}} \quad l = -M, -M+1, \ldots, -1, 1, \ldots, M-1, M,$$

and $$\text{Table2} = \frac{\sin(\pi l/N)N}{\pi e^{-j\pi/N}} \quad l = -M, -M+1, \ldots, -1, 1, \ldots, M-1, M,$$

where N represents point number of the system IFFT, and is related to the system bandwidth; u represents a serial number of a user, u=1, . . . , P, and P is the total number of the users; and $\varepsilon^{(u)}$ represents a frequency offset value, obtained by normalization of carrier spacing, of user u, and 1 represents the spacing between the target subcarrier and each adjacent subcarrier.

Those skilled in the art should know that functions of each processing unit in the device for eliminating the ICI in the embodiment of the disclosure may be understood with reference to related descriptions in the abovementioned method for eliminating the ICI, and each processing unit in the device for eliminating the ICI in the embodiment of the disclosure may be implemented by an analogue circuit which realizes the abovementioned functions of the embodiment of the disclosure, and may also be implemented by running software which executes the abovementioned functions of the embodiment of the disclosure on an intelligent terminal.

The device for eliminating the ICI in a practical application may be applied to a receiver, such as a base station or a core network element, in a wireless communication system. The acquisition unit 41, construction unit 42, interference elimination unit 44 and judgment processing unit 45 in the device for eliminating the ICI may all be implemented by a Central Processing Unit (CPU), Digital Signal Processor (DSP) or Field-Programmable Gate Array (FPGA) in the device during the practical application; and the data receiving unit 43 in the device for eliminating the ICI may be implemented by a receiver in the device during the practical application.

Those skilled in the art should know that the embodiment of the disclosure may be provided as a method, a system or a computer program product. Therefore, the disclosure may adopt a form of hardware embodiment, software embodiment and combined software and hardware embodiment. Moreover, the disclosure may adopt a form of computer program product implemented on one or more computer-available storage media (including, but not limited to, a disk memory and an optical memory) including computer-available program codes.

The disclosure is described with reference to flowcharts and/or block diagrams of the method, equipment (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above are only the preferred embodiments of the disclosure and not intended to limit the scope of the disclosure.

INDUSTRIAL APPLICABILITY

By adopting a frequency-domain filtering method in the embodiment of the disclosure, the problem of ICI in an OFDM system is effectively solved. Not only the ICI of a single user may be effectively eliminated, but also the ICI of multiple users may be effectively eliminated. In addition, the ICI caused by a large frequency offset may also be effectively eliminated, and the cost for ICI elimination is greatly reduced.

What is claimed is:

1. A method for eliminating Inter-Carrier Interference (ICI), comprising:

acquiring a user frequency offset value;

determining an order of a filter according to the user frequency offset value;

constructing filter coefficients according to the order of the filter;

receiving user carrier data; and performing ICI elimination on a target subcarrier according to frequency-domain data on adjacent subcarriers of the target subcarrier and filter coefficients of corresponding positions of the adjacent subcarriers, wherein the target subcarrier is any carrier in the user carrier data;

wherein the order of the filter is 2M+1, where M is a number of adjacent subcarriers participating in ICI elimination of the target subcarrier, and the method further comprises constructing the filter coefficients according to the order of the filter comprises:

constructing two coefficient tables of which depths are 2M+1 respectively, wherein an expression met by a first coefficient table is:

$$\text{Table1} = \frac{\cos(\pi l/N)}{e^{-j\pi/N}} \quad l = -M, -M+1, \ldots, -1, 1, \ldots, M-1, M,$$

and an expression met by a second coefficient table is:

$$\text{Table2} = \frac{\sin(\pi l/N)N}{\pi e^{-j\pi/N}} \quad l = -M, -M+1, \ldots, -1, 1, \ldots, M-1, M;$$

and constructing the filter coefficients according to the first coefficient table and the second coefficient table, an expression met by the filter coefficients is:

$$\text{filter}(l) = \begin{cases} \text{Matrix}(l), & l = -M, -M+1, \ldots -1, 1, \ldots, M \\ 1, & l = 0 \end{cases},$$

$$\text{where Matrix} = \frac{\varepsilon}{\varepsilon \cdot \text{Table1} - \text{Table2}},$$

where N represents point number of system Inverse Fast Fourier Transform (IFFT), ε represents a frequency offset value obtained by normalization of carrier spacing, and l represents a spacing between the target subcarrier and each adjacent subcarrier.

2. The method according to claim 1, wherein determining the order of the filter according to the user frequency offset value comprises:
  determining M according to the user frequency offset value; and
  determining the order of the filter to be 2M+1 according to the number M of the adjacent subcarriers participating in ICI elimination of the target subcarrier.

3. The method according to claim 1, wherein receiving the user carrier data comprises:
  receiving the user carrier data, and judging whether the user carrier data is frequency-domain data so as to obtain a judgment result;
  when the judgment result indicates that the user carrier data is frequency-domain data, directly performing ICI elimination on the frequency-domain data; and
  when the judgment result indicates that the user carrier data is time-domain data, performing Fast Fourier Transform (FFT) on the time-domain data to obtain frequency-domain data, and performing ICI elimination on the frequency-domain data.

4. The method according to claim 3, wherein performing ICI elimination on the target subcarrier according to the frequency-domain data on the adjacent subcarriers of the target subcarrier and the filter coefficients of the corresponding positions of the adjacent subcarriers comprises:
  determining the target subcarrier in the frequency-domain data, and multiplying frequency-domain values on the adjacent subcarriers of the target subcarrier and the filter coefficients of the corresponding positions of the adjacent subcarriers to obtain multiplication results corresponding to each adjacent subcarrier; and summing and outputting the multiplication results corresponding to each adjacent subcarrier to implement ICI elimination of the target subcarrier.

5. A device for eliminating Inter-Carrier Interference (ICI), comprising:
  a processor; and
  a memory for storing instructions executable by the processor;
  wherein the processor is configured to:
    acquire a user frequency offset value;
    determine an order of a filter according to the user frequency offset value, and construct filter coefficients according to the order of the filter;
    receive user carrier data; and
    perform ICI elimination on a target subcarrier according to frequency-domain data on adjacent subcarriers of the target subcarrier and filter coefficients of corresponding positions of the adjacent subcarriers, wherein the target subcarrier is any carrier in the user carrier data;
    wherein the order of the filter is 2M+1, where M is a number of adjacent subcarriers participating in ICI elimination of the target subcarrier, and the processor is further configured to construct two coefficient tables of which depths are 2M+1 respectively, wherein an expression met by a first coefficient table is:

$$\text{Table1} = \frac{\cos(\pi l/N)}{e^{-j\pi/N}} \quad l = -M, -M+1, \ldots, -1, 1, \ldots, M-1, M,$$

and
an expression met by a second coefficient table is:

$$\text{Table2} = \frac{\sin(\pi l/N)N}{\pi e^{-j\pi/N}} \quad l = -M, -M+1, \ldots, -1, 1, \ldots, M-1, M;$$

and
  construct the filter coefficients according to the first coefficient table and the second coefficient table, an expression met by the filter coefficient is:

$$\text{filter}(l) = \begin{cases} \text{Matrix}(l), & l = -M, -M+1, \ldots -1, 1, \ldots, M \\ 1, & l = 0 \end{cases},$$

$$\text{where Matrix} = \frac{\varepsilon}{\varepsilon \cdot \text{Table1} - \text{Table2}},$$

where N represents point number of system Inverse Fast Fourier Transform (IFFT), ε represents a frequency offset value obtained by normalization of carrier spacing, and l represents a spacing between the target subcarrier and each adjacent subcarrier.

6. The device according to claim 5, wherein the processor is further configured to determine M according to the user frequency offset value; and determine the order of the filter to be 2M+1 according to the number M of the adjacent subcarriers participating in ICI elimination of the target subcarrier.

7. The device according to claim 5, wherein the processor is further configured to judge whether the user carrier data is frequency-domain data to obtain a judgment result; when the judgment result indicates that the user carrier data is time-domain data, perform Fast Fourier Transform (FFT) on the time-domain data to obtain frequency-domain data.

8. The device according to claim 7, wherein the processor is further configured to determine the target subcarrier in the frequency-domain data, and multiply the frequency-domain data on the adjacent subcarriers of the target subcarrier and the filter coefficients of the corresponding positions of the adjacent subcarriers to obtain multiplication results corresponding to each adjacent subcarrier; and sum and output the multiplication results corresponding to each adjacent subcarrier to implement ICI elimination of the target subcarrier.

9. A non-transitory computer-readable storage medium, in which a computer-executable instruction is stored, the computer-executable instruction being configured to execute the method for eliminating the Inter-Carrier Interference (ICI) according to claim 1.

10. A non-transitory computer-readable storage medium, in which a computer-executable instruction is stored, the computer-executable instruction being configured to execute the method for eliminating the Inter-Carrier Interference (ICI) according to claim 2.

11. A non-transitory computer-readable storage medium, in which a computer-executable instruction is stored, the computer-executable instruction being configured to execute the method for eliminating the Inter-Carrier Interference (ICI) according to claim 3.

12. A non-transitory computer-readable storage medium, in which a computer-executable instruction is stored, the computer-executable instruction being configured to execute the method for eliminating the Inter-Carrier Interference (ICI) according to claim 4.

* * * * *